No. 659,009. Patented Oct. 2, 1900.
L. E. WATERMAN.
WHEELED PLOW.
(Application filed Jan. 16, 1900.)
(No Model.) 2 Sheets—Sheet 1.
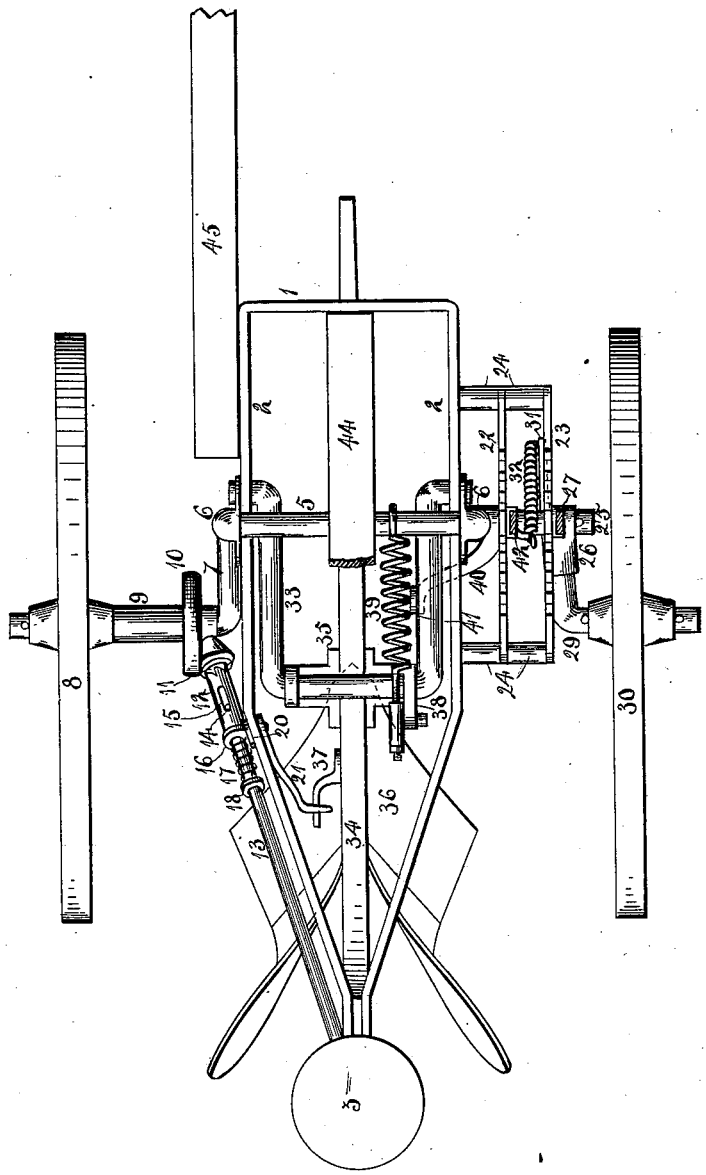

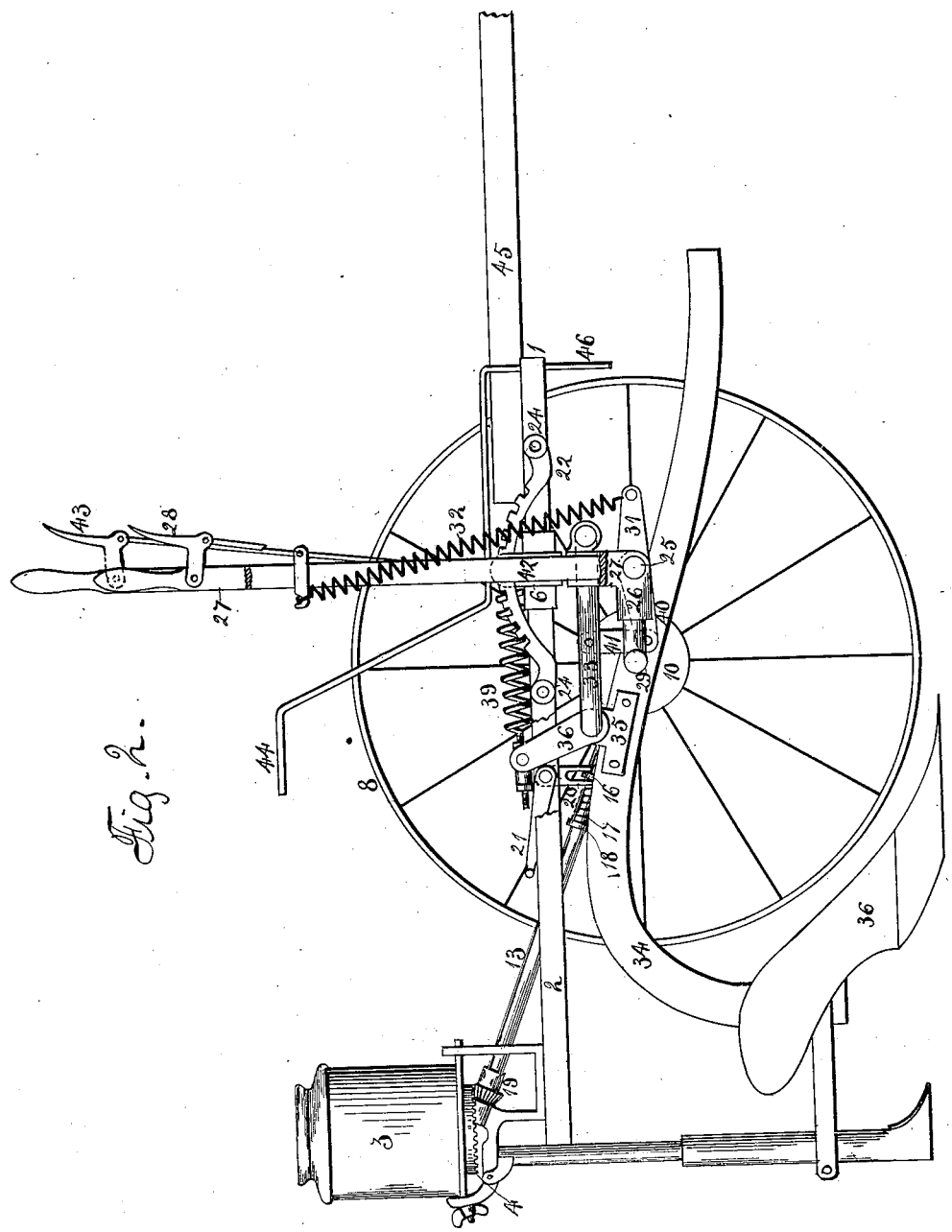

UNITED STATES PATENT OFFICE.

LEWIS E. WATERMAN, OF MOLINE, ILLINOIS, ASSIGNOR TO THE EMERSON MANUFACTURING COMPANY, OF ROCKFORD, ILLINOIS.

WHEELED PLOW.

SPECIFICATION forming part of Letters Patent No. 659,009, dated October 2, 1900.

Application filed January 16, 1900. Serial No. 1,702. (No model.)

*To all whom it may concern:*

Be it known that I, LEWIS E. WATERMAN, a citizen of the United States, residing at Moline, in the county of Rock Island and State of Illinois, have invented certain new and useful Improvements in Wheeled Plows, of which the following is a specification.

This invention relates to details of construction in a wheeled plow hereinafter set forth.

In the accompanying drawings, Figure 1 is a plan view of a wheeled plow embodying my improvements. Fig. 2 is a side elevation.

The main frame consists of the end bar 1 and side bars 2, joined together. A seedbox 3 is supported at the rear ends of the side bars 2. A beveled toothed wheel 4 has a connection with the seed-dropping mechanism of the seedbox. An axle 5 extends across the main frame and is supported by caps 6. The portion 7 of the axle extends rearward, thence outward, and receives the supporting-wheel 8. A shank 9 has a connection with the supporting-wheel 8, and within the casing 10 is located a beveled toothed wheel, which meshes with a beveled pinion having a section 11 of a saw-toothed clutch. A sliding section 12 of a saw-toothed clutch has a connection with the shaft 13 by a pin 14, located in the slot 15. The rear end of this section of the clutch has a flange 16. A spring 17 surrounds the shaft 13, one end resting against the clutch and its other end against a collar 18, secured to the shaft. A beveled pinion 19 is secured to the rear end of the shaft 13 and meshes with the beveled toothed wheel 4, operating the seed-dropping devices.

To one of the side bars of the main frame is pivoted a yoke 20, which engages the flange 16 of the movable portion of the clutch. A lever 21 has a connection with the yoke and by which it is moved.

The rotation of the supporting-wheel 8 imparts a rotary movement to the seed-dropping devices.

To one of the side bars of the main frame are secured two toothed quadrants 22 and 23, held separated by the bushings 24. Upon the end 25 of the axle is located an arm 26, having a hand-lever 27 connected therewith, the hand-lever provided with the usual thumb-lever 28 and dog for engagement with the toothed quadrant 23. A stub-axle 29 is supported by the arm 26 and receives a supporting-wheel 30. By means of this hand-lever the supporting-wheel 30 can be raised and lowered and held locked in its adjustable position. From the arm 26 extends a bracket 31, to the end of which is connected a coiled spring 32. A bail 33 has a pivotal connection with the side bars of the main frame. This bail extends rearward and has a pivotal connection with the plow-beam 34 by the brackets 35. A plow 36 is supported by the lower end of the beam. From the side of the plow-beam extends an arm 37, adapted to engage the arm 21 when the plow-beam is raised, thereby disengaging the clutch, and stop the rotation of the seed-dropping devices. From the bracket 35, connecting the bail and plow-beam, extends an arm 38, to the free end of which is connected a coiled spring 39 in an adjustable manner. The other end of this coiled spring is connected to the axle 5. This spring assists in lifting the plow.

Upon the horizontal portion 25 of the axle is mounted an arm 40, which extends rearward and is pivotally connected to a link 41. The upper end of this link has a pivotal connection with the bail 33, supporting the plow-beam. To the arm 40 is secured a hand-lever 42, having the usual thumb-lever 43 and dog arrangement for engagement with the toothed quadrant 22. The coiled spring 32 has a connection with the hand-lever 42. By means of this hand-lever 42 the bail 33 is raised or lowered, which movement will raise and lower the plow-beam, and by locking the lever in connection with the toothed quadrant 22 the plow-beam is locked in its adjusted position. The coiled spring 32, connected to the hand-lever 42 and bracket 31, serves the double purpose of assisting in raising the plow-beam when the hand-lever 42 is used and depressing the wheel 30 when the hand-lever 27 is used. A seat-support 44 and tongue 45 are connected to the main frame. A projection 46, extending from the main frame, serves as a stop to the forward end of the plow-beam when the beam is raised and will cause the rear end of the beam supporting the plow to be elevated.

I claim as my invention—

1. In a wheeled plow, a main frame, an axle rigidly connected to the frame, a wheel supported by the axle, a toothed quadrant connected to the main frame, a stub-axle supported by the main axle and supporting a wheel, and a hand-lever connecting the stub-axle with the toothed quadrant 2. In a wheeled plow, a main frame, a bail pivotally supported by the frame, a plow-beam supported by the bail, two toothed quadrants supported by the main frame, a wheel supported by the main frame, a hand-lever for moving the wheel and having a connection with one of the toothed quadrants, a hand-lever for moving the bail and having a connection with the other toothed quadrant and a spring connecting the hand-levers.

3. In a wheeled plow, a main frame, a bail pivotally supported by the main frame, a plow-beam, brackets connecting the beam and bail, an arm extending from one of the brackets and a spring connecting the arm with a stationary support.

LEWIS E. WATERMAN.

Witnesses:
A. O. BEHEL,
E. BEHEL.